United States Patent
Chen

[11] Patent Number: 6,134,303
[45] Date of Patent: Oct. 17, 2000

[54] UNITED HOME SECURITY SYSTEM

[75] Inventor: Scanner Chen, Taipei, Taiwan

[73] Assignee: Tempa Communication Inc., Taipei, Taiwan

[21] Appl. No.: 09/233,942

[22] Filed: Jan. 20, 1999

[51] Int. Cl.[7] .................................................. H04M 11/04
[52] U.S. Cl. ............................................... 379/49; 379/42
[58] Field of Search .......................................... 379/37–51

[56] References Cited

U.S. PATENT DOCUMENTS

| | | | |
|---|---|---|---|
| 3,914,692 | 10/1975 | Seaborn, Jr. | 379/38 |
| 5,134,644 | 7/1992 | Garton et al. | 379/39 |

*Primary Examiner*—Wing F. Chan
*Attorney, Agent, or Firm*—Dougherty & Troxell

[57] ABSTRACT

A united home security system for joining a plurality of client-sides is disclosed. The system includes a sensing circuit, a subscriber emergency handling/communication circuit, a client-side monitor/control server, a remote administrating and monitoring device, and an alarm transmitting network. Each client-side communicates with the remote administrating and monitoring device via a public telecom-network, for transmitting the state information at the client-side. In case an emergency signal is detected at any client-side, the client-side monitor/control server communicates with the remote administrating and monitoring device via the telecom-network, and then an alarm signal is generated by the alarm transmitting network.

6 Claims, 5 Drawing Sheets

UNITED HOME SECURITY SYSTEM

BACKGROUND OF THE INVENTION

1. Field of the Invention

The invention relates to a security network, and more particularly to a united security device which incorporates a plurality of security systems at client-sides into a whole security network system.

2. Description of the Prior Art

The conventional home security system typically needs wiring connection to electrically connect a number of indicating lights, buzzers, emergency buttons, and common power source connection at every house end. In the case that an emergency happens to any in the common system (for example, including 8–16 house ends), the application at one emergency button will trigger all buzzers and indicating lights in the system for successfully broadcasting the emergency situation and sending out the emergency signal.

However, the construction of the common power source, relative electricity devices, and the electrical wiring network is easily to be damaged, and thus is apt to induce a fault triggering which will disturb all customers in the system, raise unexpected anxiety, and even cause the whole system to shut down.

In considering the electric utilities safety, the conventional wiring system is usually restricted by the existing construction. For example, difficult work such as digging or breaking the wall is always possible in constructing the wiring. Also, the geometrical characteristics in the neighborhood enhance the possibility of exposing the wiring to the atmosphere while the wiring passes across the street and in which will increase the maintenance problem as well.

SUMMARY OF THE INVENTION

Accordingly, it is an object of the present invention to provide a united home security system, which needs no wiring work and which can provide better security a tremendous amount of customers. Under the united home security system according to the present invention, when anyone in the network happens to have an emergency situation, an alarm transmitting network will call out for help, by interrupting the network and sending out relevant message to neighbors, police station, emergency units, or any related person and local administrant. Also, the residents protected by the security network in accordance with the present invention can select necessary equipment according to his own need, without affecting the operation of the whole network. Therefore, the reduction in accidents, better crime watch, and increasing the safety of the community can be achieved.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to a united home security system. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
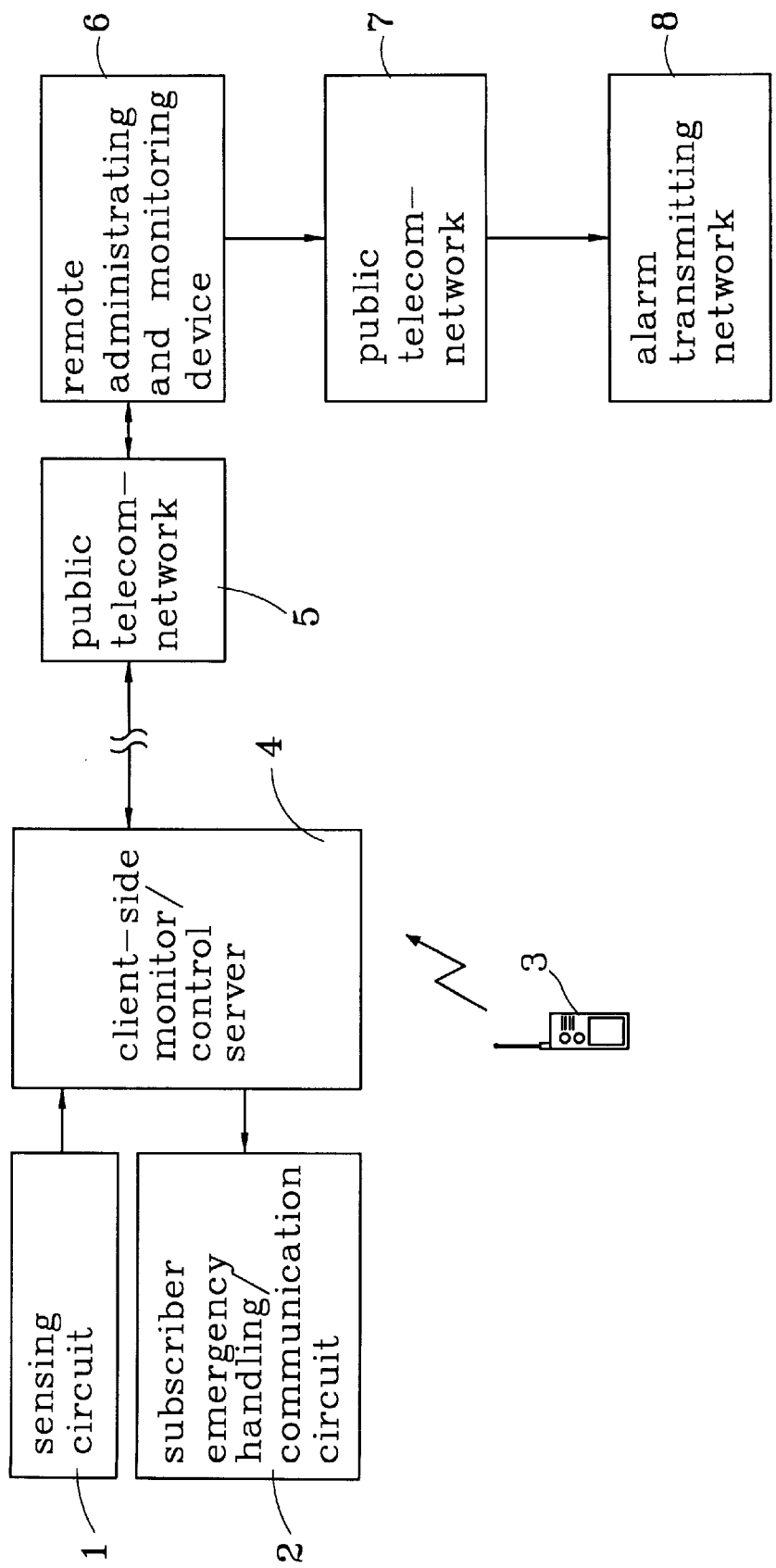
FIG. 1 is a block diagram of a united home security system in accordance with the present invention.

Referring now to FIG. 1, a framework of the united home security system in accordance with the present invention is shown. The united home security system comprises a sensing circuit 1, a subscriber emergency handling/communication circuit 2, a remote controller 3, a client-side monitor/control server 4, a remote administrating and monitoring device 6, and an alarm transmitting network 8.

The remote administrating and monitoring device 6 is coupled with the client-side monitor/control server 4 and the alarm transmitting network 8 respectively, through corresponding public telecom-networks 5 and 7.

Figure 2:
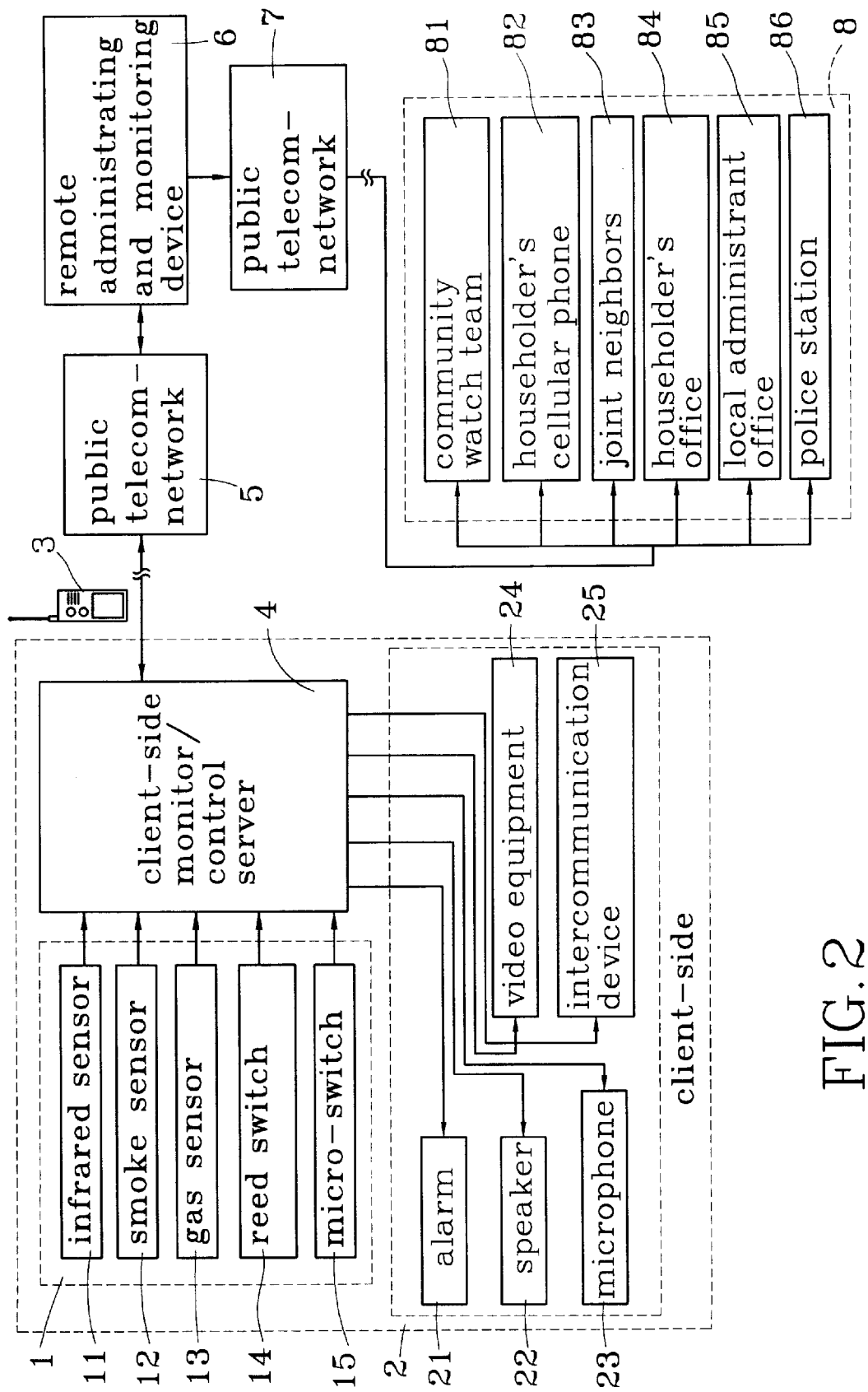
FIG. 2 is a block diagram showing the system application at a single client-side.

The sensing circuit 1 includes various types of detecting devices; such as infrared sensors 11, smoke sensors 12, gas sensors 13, reed switches 14, micro switch 15, and so on. As shown in FIG. 2, these detecting devices are installed, for monitoring, at proper locations, for example doors, windows, doorways, kitchen, and so on, at the client-side, in such a manner that the installation and the determination of a proper location are in accordance with the characteristics of individual component. Moreover, any state information detected by aforesaid detecting device can be forwarded to the client-side monitor/control server 4 wiredly or wirelessly.

In case of a preset special incident, the subscriber emergency handling/communication circuit 2 is capable of generating an alarm signal or other responsive action at the client-side, under the control of the client-side monitor/control server 4 or the remote administrating and monitoring device 6. For example, the subscriber emergency handling/communication circuit 2 can include an alarm 21, a speaker 22, a microphone 23, a video equipment 24, an intercommunication device 25, and so on. The remote controller 3 is used to set or preset the client-side monitor/control server 4.

As soon as the client-side monitor/control server 4 receives a signal from any of the aforesaid detecting devices, it will forward the signal to the remote administrating and monitoring device 6 via the public telecom-network 5. After the signal is decoded and determined, the remote administrating and monitoring device 6 will send out a corresponding message to the alarm transmitting network 8 via the public telecom-network 7.

The alarm transmitting network 8 comprise a community watch team 81, a householder's cellular phone 82, a joint neighbor 83, a householder's office 84, a local administrant 85, a police station 86, and so on.

Figure 3:
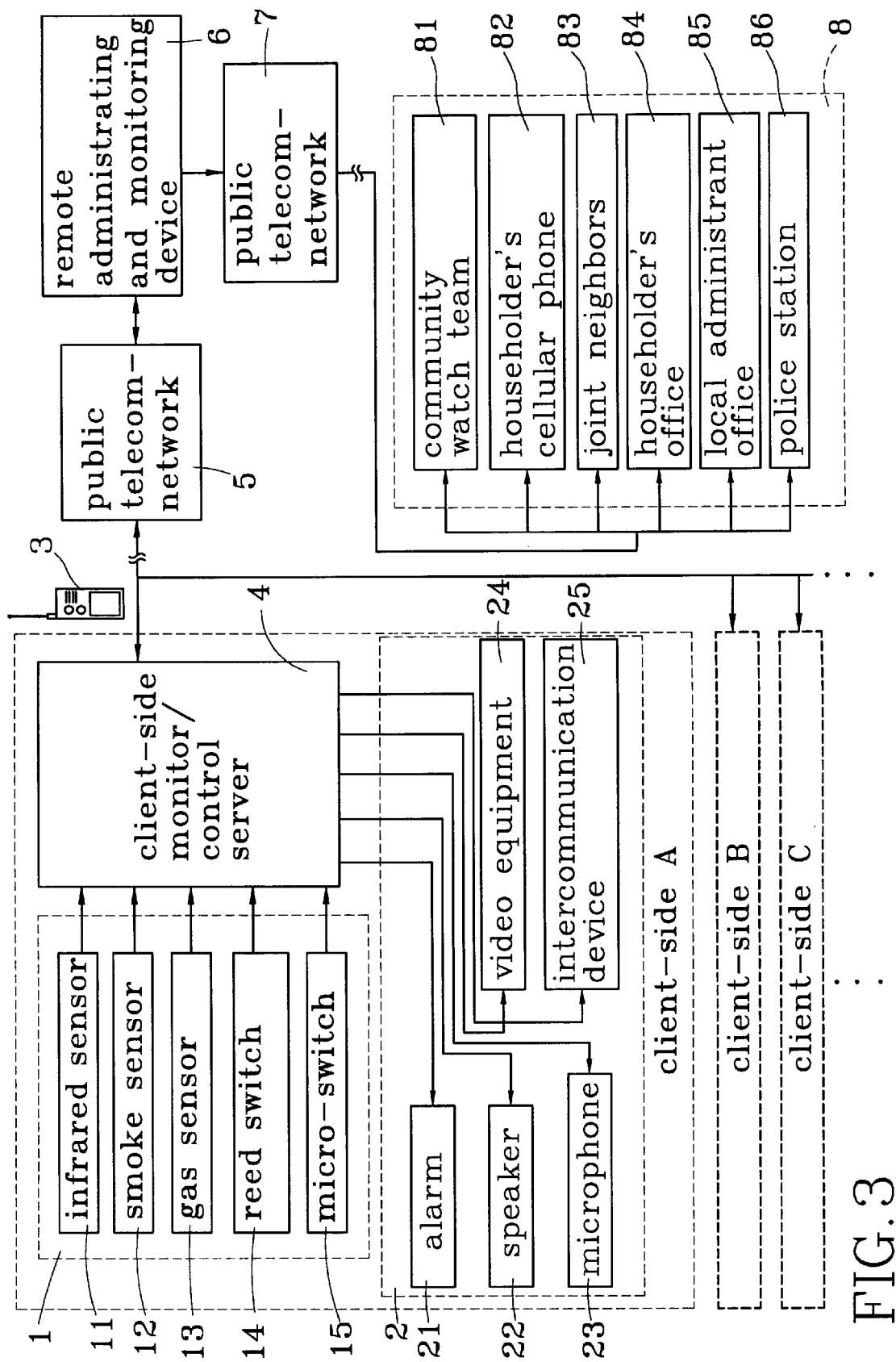
FIG. 3 is a block diagram showing the system application at a plurality of client-sides.

Referring now to FIG. 3, the present invention is shown to be applied to a plurality of client-sides, for example client-sides A, B, and C. Contrary to the embodiment shown in FIG. 2, in which a single client-side is included in the security network. It is obvious that several client-sides can be successfully united as a united home security system in accordance with the present invention.

Figure 4:
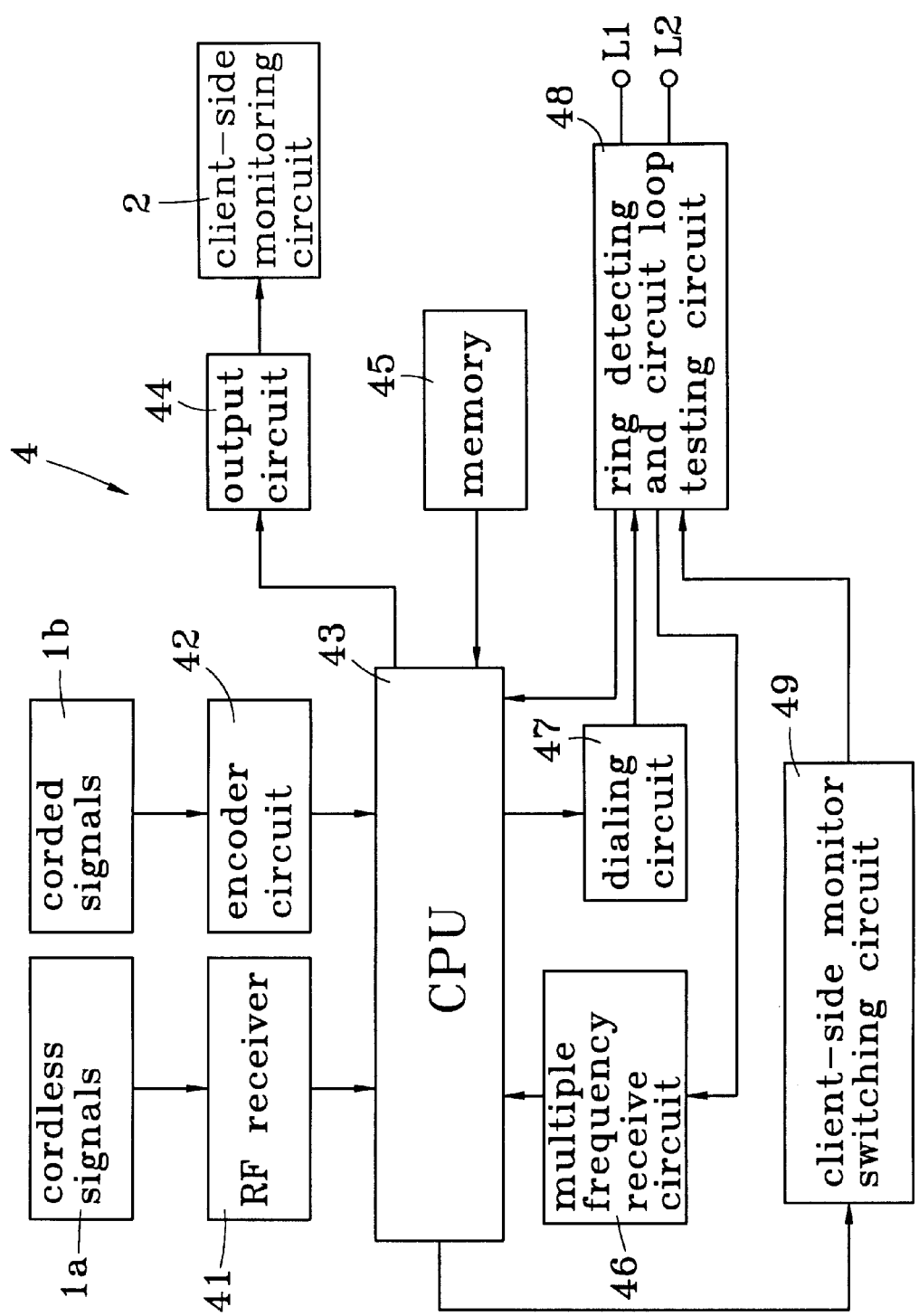
FIG. 4 is a block diagram showing the internal circuit framework of the client-side monitor/control server of FIG. 1.

FIG. 4 illustrates the block diagram of the client-side monitor/control server 4 shown in FIG. 1, which comprises:

a RF receiver 41, for receiving the wireless detecting signal 1a from the remote controller 3 and the sensing circuit 1, and for forwarding the detected signal to the central processing unit 43;

an encoding circuit 42, for receiving the wired detecting signal 1b from the sensing circuit 1, and for forwarding the detected signal to the central processing unit 43 for further determination after transforming the signal to corresponding BCD code;

a central processing unit 43, for controlling the client-side monitor/control server 4;

an output circuit 44, for receiving the output control signal from the central processing unit 43, in order to drive all devices in the subscriber emergency handling/communication circuit 2;

a memory unit 45, for storing the communication code, encoding table, and control program needed while transmitting signal, and providing the central processing unit 43 the data for encoding, determining, and process control;

a DTMF receiving circuit 46, for receiving the DTMF signal from the ring detecting and circuit loop testing circuit 48 and forwarding the decoded signal to the central processing unit 43, the central processing unit 43 generating accordingly corresponding control output or ON/OFF the communication loop;

a dialing circuit 47, controlled by the central processing unit 43, for performing the dialing to the remote administrating and monitoring device 6 and generating DTMF signal according to the encoding table in order to communicate with the remote administrating and monitoring device 6;

an ring detecting and circuit loop testing circuit 48, connected with the telephone lines L1 and L2 of the telecom-network, for detecting the ringing signal and testing the normal operation of the telephone loop; and a client-side monitor switching circuit 49, controlled by the central processing unit 43, for performing the switching among recording, alarming, mute, or intercommunication at the client-side.

Figure 5:
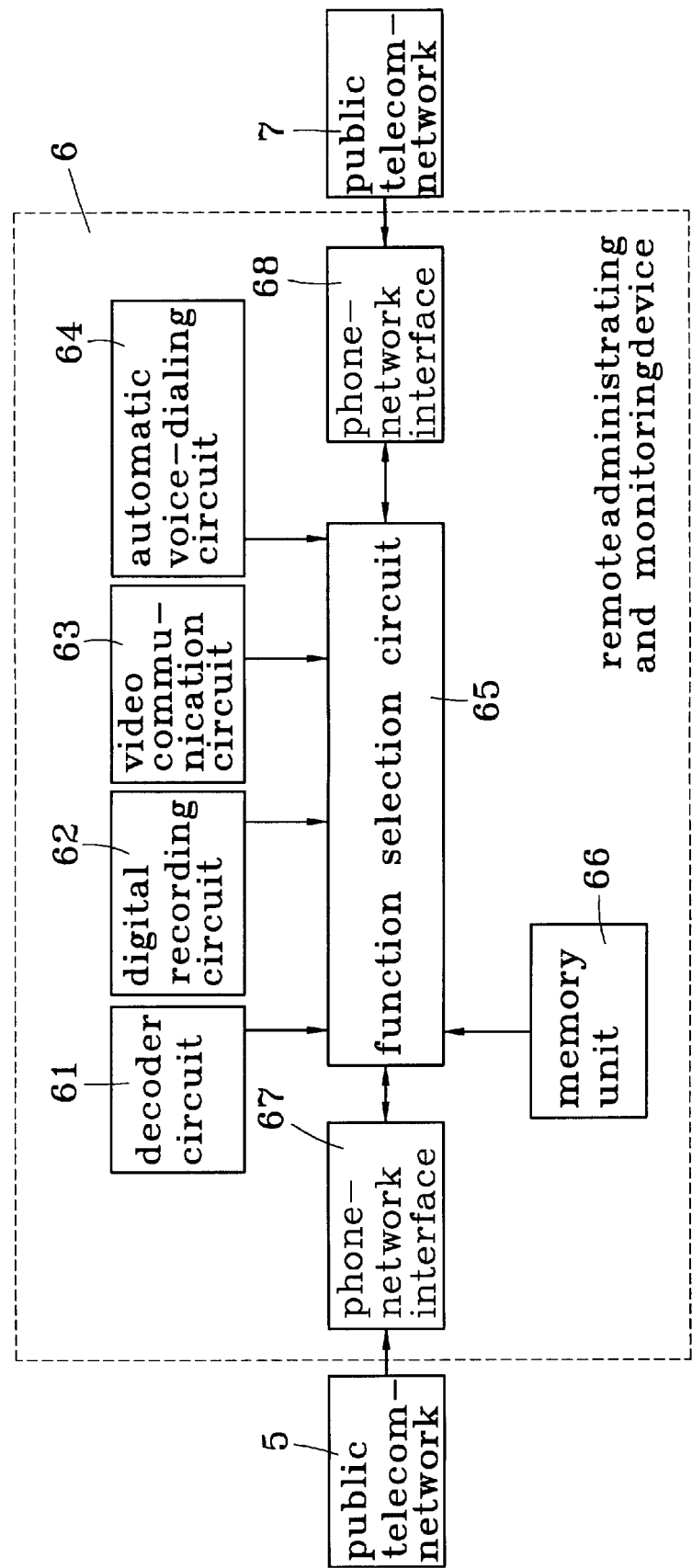
FIG. 5 is a block diagram showing the internal circuit framework of the remote administrating and monitoring device of FIG. 1.

FIG. 5 illustrates the block diagram of the remote administrating and monitoring device 6 shown in FIG. 1, which comprises:

a decoder circuit 61, for decoding the DTMF signal from the client-side monitor/control server 4 via the public telecom-network 5 for further signal determination;

a digital recording circuit 62, for recording the abnormal sound signal (ex. sound signals from a theft, a bothering, a help from children or seniors, a fire, and so on);

a video communication circuit 63, for providing the video communication function in need to the client-sides;

an automatic voice-dialing circuit 64;

a function selection circuit 65, for switching among various functions, and in connection with the public telecom-network 5 and 7 via the telephone network interfaces 67 and 68, respectively; and a memory unit 66, for storing the data base of the customer and for controlling the programs on group calling, alarming, and remote security.

Under aforesaid framework, individual client can dial to the remote administrating and monitoring device 6 via any available public telecom-network, for transmitting the state information to the monitoring and control center. In addition, while transmitting the signal, except for the conventional fixed encoding technique, varying encoding technique can also be used for increasing the transmission security. The transmitted signal format can include signal-reconfirmation, transformed code, client-side off-line, alert, relief of the customer code, re-transferring, broadcasting, talk monitoring, emergency help, fire, gas leak, electricity shortage, door/window, front door, rear door open, and video monitoring, and so on.

After the remote administrating and monitoring device 6 decodes the signal from the client-side, it can directly override the subscriber emergency handling/communication circuit 2, and perform immediately the broadcast monitoring, communication, tape recording, alarm sound intensity control, utility remote control, relieving the off-line, and so on. At the same time, the remote administrating and monitoring device 6 can send out the preset calling message, via the public telecom-network, to various phones or mobile communication devices; such as the beeper, mobile phone, fire station, police station, local administrant, and those stated in the alarm transmitting network 8 of FIG. 3. Therefore, real time broadcasting and on-line monitoring can be proceeded till the emergency state is expelled.

While the present invention has been particularly shown and described with reference to preferred embodiments, it will be understood by those skilled in the art that various changes in form and detail may be without departing from the spirit and scope of the present invention.

What is claimed is:

1. A united security system comprising:
 a) a sensing circuit in at least one location to be secured, including at least one sensing device to generate a detection signal;
 b) a client-side monitor/control server located in the at least one location to be secured, the client-side monitor/control server including a central processing unit to receive the detection signal and to generate a first alarm signal;
 c) a remotely located administrating and monitoring device for receiving the first alarm signal and for generating a second alarm signal;
 d) an alarm receiving network located remotely from the administrating and monitoring device, and from the at least one location to be secured;
 e) a first public telecom network connecting the at least one location to be secured to the administrating and monitoring device for transmitting the first alarm signal to the administrating and monitoring device; and,
 f) a second public telecom network connecting the administrating and monitoring device to the alarm receiving network for transmitting the second alarm signal to the alarm receiving network.

2. The united security system according to claim 1, further comprising a remote controller for setting the client-side monitor/control server.

3. The united security system according to claim 1, further comprising a subscriber emergency handling/communication circuit, connected to and controlled by the client-side monitor/control server.

4. The united security system according to claim 3, wherein said subscriber emergency handling/communication circuit includes alarms, speakers, microphones, video devices, and intercommunication devices.

5. The united security system according to claim 1, wherein said sensing circuit comprises pluralities of wired sensing devices and wireless sensing devices.

6. The united security system according to claim 1, wherein said sensing circuit comprises infrared sensors, smoke sensors, gas sensors, reed switches, and micro switches.

* * * * *